Patented June 27, 1933

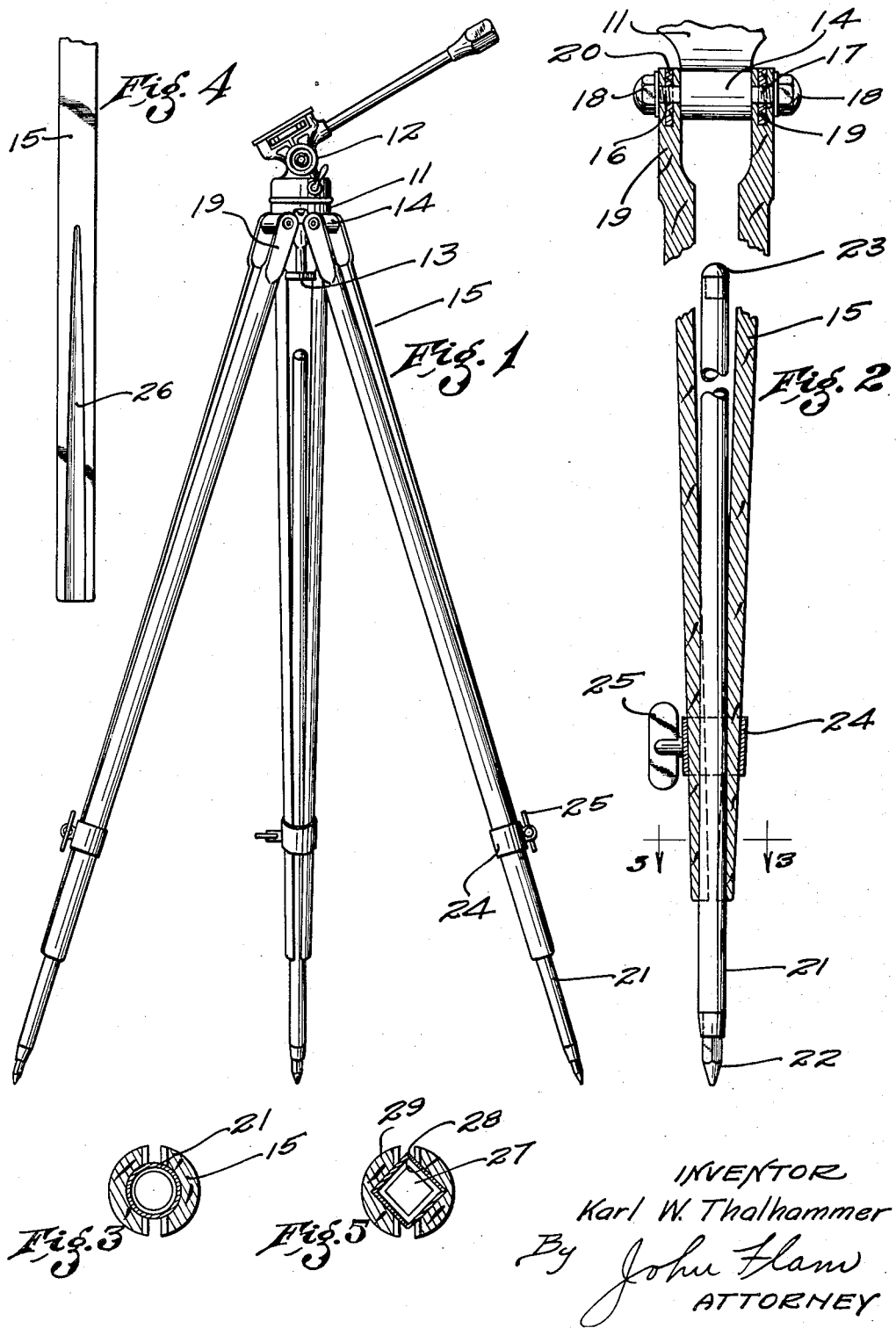

1,915,628

UNITED STATES PATENT OFFICE

KARL W. THALHAMMER, OF LOS ANGELES, CALIFORNIA

TRIPOD LEG STRUCTURE

Application filed March 26, 1928, Serial No. 264,930. Renewed November 28, 1932.

This invention relates to a tripod structure, and especially one that can be used for cameras, surveying instruments or the like. More particularly, my invention concerns the construction of the folding legs that are ordinarily used for such tripods, to vary the height thereof.

The term "tripod" used herein is intended to cover generally all folding structures whether having three or more legs.

It is one of the objects of my invention to provide a compact tripod structure that can readily be adjusted for varying heights, and that is rigid and strong after such adjustment.

It is another object of my invention to provide a novel form of leg structure for such tripods, that is not only simple to manufacture, but that can readily be held in any adjusted position.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

Figure 1 is a front elevation of a tripod embodying my invention, and shown as supporting a tilting head, upon which an instrument can be in turn supported;

Fig. 2 is an enlarged detail section, partly broken away, through one of the legs of the tripods shown in Fig. 1;

Fig. 3 is a detail sectional view taken along plane 3—3 of Fig. 2;

Fig. 4 is a fragmentary enlarged view of the lower portion of the leg structure; and Fig. 5 is a cross section of a modified form of leg structure.

In Fig. 1, I show a tripod head 11, upon which is screwed a tilting head structure 12 fastened to the head 11 by the aid of a front screw 13. The tripod head 11 is provided with a series of bosses 14, three being used in this instance, which serve to support pivotally a number of tripod legs 15.

As shown most clearly in Fig. 2, each boss 14 is provided with a pair of oppositely extending threaded pins 16, 17. The legs 15 are made of two separate parts, converging toward the ends. Each part has an apertured ear 19. Each pair of ears encompasses a boss 14, and are hinged on pins 16, 17 fastened to the boss. The nuts 18 hold the ears on the pins. The ears 19 for each leg section are spaced quite widely apart, whereby the tendency for the leg 15 to twist is obviated.

The tripod leg 15 can be made of any desired material, but I prefer it to be made of wood whereby some resilience is secured. The ears 19 are reenforced by wooden veneer inserts 20, through which the pins 16 pass, whereby splitting of the wood at these ears is prevented.

Between the two portions forming leg 15 is slidable the lower leg structure 21. This structure can be made of metal, such as a hollow tube, provided at one end with a metal point 22; and at the other end, with a rubber inset or button 23. By reversing the lower leg section 21 in the upper leg section 15, it is possible to provide either sharp points, or friction points for the ends of the legs, whereby the tripod can be supported either on a smooth surface or on such a surface as a rug or carpet.

In order to clamp the telescoping leg 21 in any desired position, there is provided adjacent the lower extremity of section 15, a strap or clamp arrangement 24, and a thumb screw 25. As the thumb screw is tightened, the strap 24 draws the free converging ends of the leg 15 closely around the tube 21, which is thereby held in its adjusted position.

Each half of leg section 15 is provided with a long deep groove 26 at its extremity, in order to furnish a seat for the lower telescoping section 21. This groove tapers toward the top of the leg 15, as indicated most clearly in Fig. 4. A large clamping surface is provided for the tube 21 by this groove. It is so arranged that the guide formed by the two opposed grooves in the end of leg section 15 has an axis coincident with that of tube 21, in spite of the fact that the halves forming leg section 15 converge. Since the wood from which the tripod legs 15 are made is pliable, the clamping of the two halves together adjacent the lower extremity of the leg by operation of the thumb screw 25 acts to provide a considerable frictional force, clamping the section 15 tightly upon the tube 21. This feature is of importance, for it ensures a stable and solid structure for the tripod.

In the form shown in Figs. 1 to 4, the lower leg section 21 is shown as circular in form. However, it is possible to use any other sectional form for this leg. In the form illustrated in Fig. 5, for example, the leg section 27 is shown as substantially square. It is accommodated in the tapered groove 28 in the upper leg section 29. The mode of operation is however substantially the same as described in connection with the first form.

I claim:

1. In a folding leg structure, an upper leg portion having a pair of sections, each of said sections having means whereby it can be pivotally supported at one end, said sections converging toward each other at the other end, and each section having a long tapering groove extending from the converging end, said groove becoming deeper toward the converging end, a lower leg in the said tapering grooves, and means for clamping the sections on the lower leg near the converging ends of said sections.

2. In a folding leg structure, a pair of members converging together at one end, each of said members being pivotally supported adjacent the end remote from the converging end, and each of said members having a long tapered groove in its inner surface extending from the converging end for a considerable distance from said end, said groove becoming deeper toward the converging end, a leg slidable in the grooves, and means for clamping the two members upon the leg, adjacent their converging ends.

In testimony whereof I have hereunto set my hand.

KARL W. THALHAMMER.